July 27, 1926.
H. HARTER
1,593,657
PRODUCTION OF AMMONIA BY SYNTHESIS AND APPARATUS THEREFOR
Filed Oct. 28, 1925
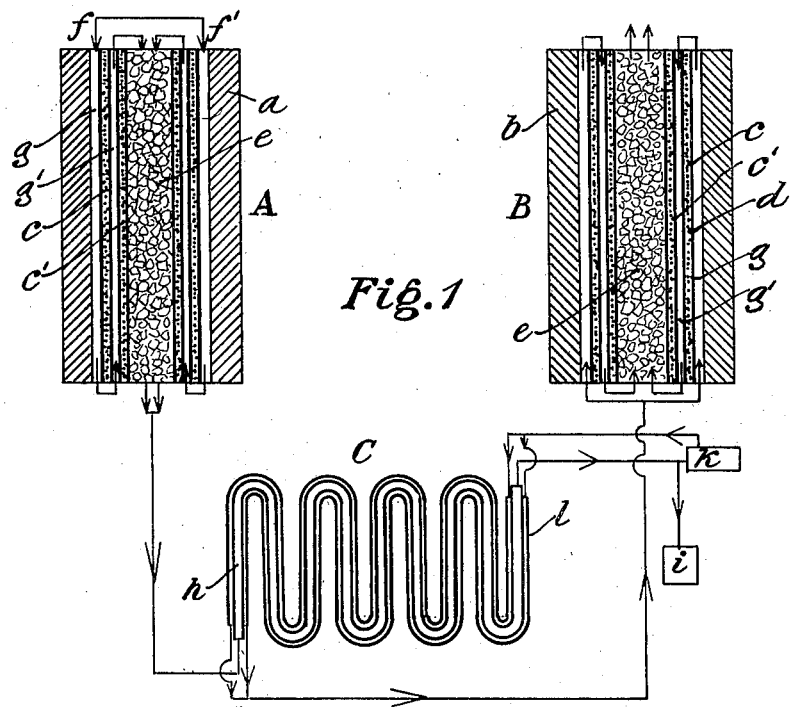
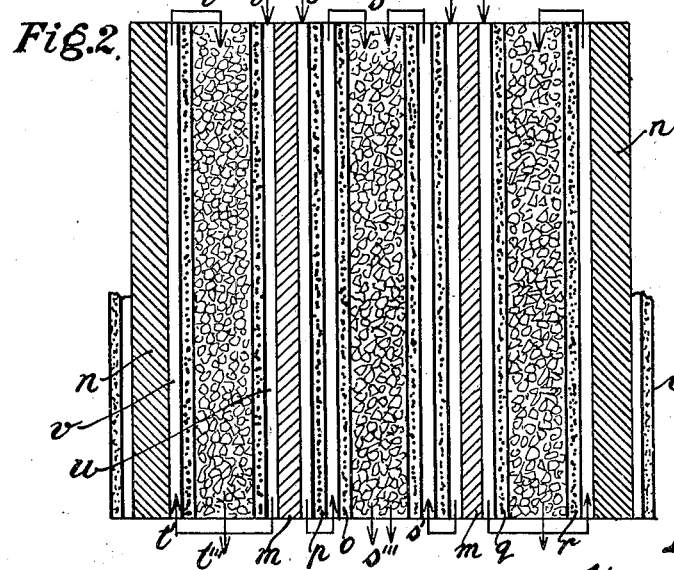
Inventor:
Hans Harter
by
C. W. Fairbanks
Attorney Patented July 27, 1926.

1,593,657

UNITED STATES PATENT OFFICE.

HANS HARTER, OF WURZBURG, GERMANY.

PRODUCTION OF AMMONIA BY SYNTHESIS AND APPARATUS THEREFOR.

Application filed October 28, 1925, Serial No. 65,273, and in Germany August 11, 1925.

It has already been proposed in the production of ammonia from its elements by means of catalysts to combine the two methods generally known as high-pressure and low-pressure synthesis into one single process and, in this case to directly utilize the reaction heat produced by the high pressure synthesis for the low pressure synthesis. This combined process, however, presents the drawbacks that the walls of the catalytic chambers under pressure are attacked not only by the resulting heat but also by the hydrogen gas contained in the gas mixture, and further, that the reaction temperature in the low-pressure apparatus cannot be kept sufficiently constant.

According to my present invention these drawbacks are avoided by directly or indirectly transmitting the heat, resulting from the high-pressure synthesis, to the low-pressure catalyst by means of the reaction gases themselves. For this purpose the high-pressure chambers as well as the low-pressure ones are provided with insulating cylinders arranged between the catalyst and the walls of the said chambers, and, if desired, also surrounding the said walls. These insulating cylinders are double-walled, and the space between their walls is filled with the insulating material, such as coal gravel, diatomite, kieselguhr, corundum, tridemite, powdered quartz, silica gel etc., either in solid or broken or plastic form, whereas the catalytic substances may be placed in the hollow space of the inner wall of the insulating cylinder. Instead of filling double-walled sheet-iron cylinders with the insulating material, these insulating cylinders may also be formed of the insulating substance itself, for instance of chamotte, quartz, zirconic oxide etc. By passing the reaction gases through the annular spaces formed by the said insulating cylinders, the walls of the tubes under pressure are protected against the action of the reaction heat and the hydrogen; on the other hand, a means is produced for regulating at will the transmission of the reaction heat to the low-pressure system. This may be effected by suitably choosing the insulating material and the thickness of the insulating layers. Thus for instance by a layer of kieselguhr or coal gravel having a thickness of 2¼ inches, the temperatures can be easily regulated in such a manner that only 30 to 40 per cent of the whole reaction heat, for instance, of the high-pressure tube is transmitted to the walls under pressure or to the low-pressure system respectively. As the catalyst is arranged in the hollow space of the insulating cylinder the double walls of which are filled with the insulating material, the main part of the reaction heat is kept away from the walls of the cylinder under pressure, so that they attain a temperature of 300 to 400° centigrade at most, at which temperature the noxious action of hydrogen on iron is equal to zero, as is generally known. Owing to this protection of the tubes under pressure I need not employ a costly special steel, as for instance $V_2A$ for making the pressure tubes, but I can make them of ordinary Siemens-Martin steel, and in case I employ a special steel the durability of the tubes is considerably increased.

In carrying out my process I may arrange the high-pressure and low-pressure apparatus either one within the other or in juxtaposition. In both cases, the high-pressure as well as the low-pressure apparatus may each be provided with two insulating cylinders arranged in the interior of them.

In order that the invention may be more clearly understood and readily carried into effect, it will now be described in detail with reference to the accompanying diagrammatic drawings, wherein:—

Figure 1 is a diagrammatic sectional view, showing a combined high-pressure and low-pressure system in juxtaposition connected by a heat exchanging device.

Figure 2 is a similar sectional view, showing the high-pressure and the low-pressure system arranged one within the other.

The same reference letters are used in both figures for corresponding parts.

Referring first to Fig. 1, A is a partial longitudinal section through the high-pressure contact apparatus, B is a similar section through the low-pressure apparatus, and C is a longitudinal section through the pipes of a heat-exchanger. $a$ indicates the wall proper of the high-pressure tube, and $b$ the wall of low-pressure tube. Two double-walled insulating cylinders $c$, $c'$ are provided in the interior of both tubes $a$ and $b$, the insulating material $d$ being indicated by dotting. The hollow spaces of the inner insulating cylinders $c'$ are shown filled with catalytic substances $e$, shown to have the form of lumps.

The gas mixture will enter into the high-pressure apparatus in the direction of the arrows $f$, $f'$. It will pass the annular spaces $g$, $g'$ and then enter the central tube formed by the inner insulating cylinder. After having passed the catalyst $e$, the hot ammoniacal gas is introduced into the interior winding $h$ of the heat exchanger C, and finally into the condenser $i$.

On the other hand, the low-pressure gas mixture coming from the compressor $k$ is passed through the outer winding $l$ of the heat exchanger C in counter-current with the hot high-pressure gas and is then introduced into the annular space $g$ between the outer wall $b$ and the outer insulating cylinder $c$ of the low-pressure apparatus B. The further course of the gas mixture is indicated by arrows. The gas passes the annular space $g'$; flows through the catalyst $e$ and may then be conducted to the condenser.

Fig. 2 is a fractional sectional view similar to Fig. 1, but showing the high-pressure apparatus arranged concentrically in the center of the low-pressure apparatus. $m$ is the wall of the high-pressure tube and $n$ the wall of the low-pressure tube. $o$, $p$, $q$ and $r$ are the double-walled insulating cylinders, $e$ indicates the high-pressure and $e'$ the low-pressure catalyst. The high-pressure gas is passed in the direction of the arrows $s$, $s'$, $s''$, $s'''$ and the low-pressure gas in the direction of the arrows $t$, $t'$, $t''$, $t'''$.

The low-pressure gas is preheated in this case in the annular space $u$ by the heat radiating from the wall of the high-pressure tube. The gas is further heated in the annular space $v$ by the reaction heat produced in the low-pressure tube, and then reaches the low-pressure catalyst. Should the heat thus transmitted to the low-pressure gas not suffice, the gas before being passed to the low-pressure catalyst may be further heated by passing it through the outer winding of a heat exchanger similar to C in Fig. 1, the inner winding of which is passed in counter-current by the hot gases coming from the high-pressure tube.

As already mentioned before, in the case illustrated by Fig. 2, the high-pressure and the low-pressure apparatus are also provided with two insulating cylinders. Thus it will be possible to adapt the reaction heat of the high-pressure system to the reaction temperature which in each case will be peculiar to the low-pressure catalyst. For this purpose a corresponding thickness of the insulating layer in the high-pressure tube is chosen, and furthermore the low-pressure gas may be heated to the desired degree—in addition to the heat radiated by the high-pressure system—by the ammoniacal high-pressure gases in an exchanger. The exchanger is disconnected as soon as the temperature of the low-pressure gases tends to surpass the suitable reaction temperature.

As a modification, the low-pressure tube $n$ may be jacketed with a further insulating cylinder $c''$, part of which has been shown broken away.

Another method of proceeding is to surround the high-pressure apparatus with a pressure-tube having a greater diameter, and passing the cold gases for the low-pressure system under the pressure required for this system, through the annular space between the said tube and the high-pressure apparatus, so that the gases absorb the heat radiating from the high-pressure apparatus and convey the same to the low-pressure system. In this case also the high-pressure system may be provided with an insulating cylinder. Thus the low-pressure gases will absorb only the heat flowing through the insulating layer to the high-pressure tube, whereas the rest of the reaction heat from the high-pressure system may be transmitted to the preheated low-pressure gases in a heat exchanger.

I claim:—

1. In a combined high-pressure and low-pressure apparatus for producing ammonia from its elements by catalysis, the arrangement of the insulating layers between the catalyst and the walls of the high-pressure and the low-pressure chambers, and means for transmitting a desired quantity of the heat produced in the high-pressure system to the low-pressure system.

2. In an apparatus according to claim 1, the arrangement of insulating layers between two concentric cylinders.

3. In an apparatus according to claim 1, the combination of the high-pressure and the low-pressure system with a heat exchanger and means for conducting the hot gases resulting from the high-pressure system and the gases to be supplied to the low-pressure system through the said exchanger in counter-current.

4. In an apparatus according to claim 1, the arrangement of the insulating layers in such a manner that spaces are left between the said layers and the corresponding wall, and means for conducting the gases through the said spaces.

5. In an apparatus according to claim 1, the arrangement of a plurality of insulating layers between the catalyst and the walls of the high-pressure and the low-pressure chambers, spaces being left between the subsequent insulating layers and between the outer insulating layer and the adjacent wall, and means for conducting the gases through the said spaces.

In testimony whereof I affix my signature.

HANS HARTER.